3,190,795
ISOTHIOUREIDOMETHYL ANTHRACENE COMPOUNDS AND PESTICIDAL COMPOSITIONS
William H. Hensley, Raleigh, N.C., and Glenn A. Carte, Charleston, W. Va., assignors to Union Carbide Corporation, a corporation of New York
No Drawing. Filed Aug. 31, 1962, Ser. No. 220,861
8 Claims. (Cl. 167—30)

The present invention relates to a novel class of chemical compounds and is also concerned with pesticidal compositions containing the said compounds.

The novel compounds of this invention can be described as anthracenes carrying an isothioureidomethyl radical in one or both of the 9 and 10 positions of the anthracene polycycle and can thus be represented by the general formula (I)

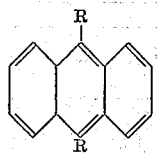

wherein at least one of the R groups represents an isothioureidomethyl radical.

The term "isothioureidomethyl radical" as used herein is meant to refer to structures of the formula (II)

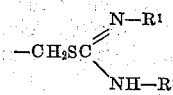

wherein $R^1$ and $R^2$ individually can represent hydrogen; or a hydrocarbyl radical monovalently bonded to the N atom through a carbon atom of said hydrocarbyl radical, or substituted hydrocarbyl, for example, halogenated hydrocarbyl, similarly linked to said N atom of the isothiourea moiety; or such radicals as amide,

or thioamide,

and wherein $R^1$ and $R^2$ taken together can represent a straight chain or branched chain alkylene radical of at least 2 and up to about 6 carbon atoms, to form a heterocyclic thiourea moiety. Typical of said hydrocarbyl radicals represented by $R^1$ or $R^2$ are lower alkyl, such as alkyl of up to about 18 carbon atoms, and preferably of up to 4 carbon atoms; and arylalkyl and alkaryl having no more than about 10 carbon atoms. Typical of the said alkylene radicals represented by $R^1$ and $R^2$ taken together are ethylene, trimethylene, and branched-chain alkylene radicals of up to 6 carbon atoms but containing not more than 3 carbon atoms forming part of the heterocyclic ring structure.

Also within the compass of this invention are the acid salts of the aforedescribed compounds wherein an inorganic or organic acid forms part of the said methylthiourea radical, as can be shown by the following grouping:

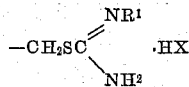

wherein HX represents an inorganic mineral acid such as HCl, HBr, HI, HF, $H_3PO_4$, $H_2SO_4$, $HNO_3$, and the like, or an alkanoic acid of up to about 4 carbon atoms, such as acetic acid, propionic acid, butyric acid, and the like. Thus it can be seen that X may represent an inorganic acid anion or an acyloxy group.

As specifically exemplary of the compounds of this invention there can be mentioned the following: 9-(isothioureidomethyl)anthracene, 9-(N-methylisothioureidomethyl)anthracene, 9-(N,N'-dimethylisothioureidomethyl)anthracene, 9-(N-ethylisothioureidomethyl)anthracene, 9-(N-propylisothioureidomethyl)anthracene, 9-(N-butylisothioureidomethyl)anthracene, 9-(N-decylisothioureidomethyl)anthracene, 9-(N-octadecylisothioureidomethyl)anthracene, 9-(N-phenylisothioureidomethyl)anthracene, 9-(N-tolylisothioureidomethyl)anthracene, 9-(N-xylylisothioureidomethyl)anthracene, 9-(N-cumenylisothioureidomethyl)anthracene, 9-(N-p-diphenylisothioureidomethyl)-anthracene, 9-(N-α-naphthylisothioureidomethyl)anthracene, 9-(N-(2,4-dichlorophenyl)isothioureidomethyl)anthracene, 9-(N-(4-chloro-o-tolyl)isothioureidomethyl)anthracene, and the like, and the corresponding bis compounds, wherein both R's in Formula I, above, represent isothiourea radicals, as in 9,10-bis(isothioureidomethyl)-anthracene, 9,10 - bis(N-methylisothioureidomethyl)anthracene, 9,10-bis(N,N'-dimethylisothioureidomethyl)anthracene, 9,10 - bis(N-ethylisothioureidomethyl)anthracene, 9,10-bis(N - propylisothioureidomethyl)anthracene, 9,10 - bis(N-butylisothioureidomethyl)anthracene, 9,10-bis(N-decylisothioureidomethyl)anthracene, 9,10-bis(N-octadecylisothioureidomethyl)anthracene, 9,10 - bis(N-phenylisothioureidomethyl)anthracene, 9,10 - bis(N-tolyl-isothioureidomethyl)anthracene, 9,10-bis(N-xylylisothioureidomethyl)anthracene, 9,10 - bis(N - cumenylisothioureidomethyl)anthracene, 9,10 - bis-(N-p-diphenylisothioureidomethyl)anthracene, 9,10 - bis(N-α-naphthylisothioureidomethyl)anthracene, 9,10 - bis(N-(2,4-dichlorophenyl)isothioureidomethyl)anthracene, 9,10 - bis(N-4-chloro-o-tolyl)isothioureidomethyl)anthracene, and the like.

Also exemplary of our novel compounds are those having an amide or thioamide group incorporated in the said isothioureidomethyl radical, as in 9-(N-carbamoylisothioureidomethyl)anthracene, 9-(N-thiocarbamoylisothioureidomethyl)anthracene, 9,10-bis(N - carbamoylisothioureidomethyl)anthracene, 9,10-bis(N - thiocarmaboylisothioureidomethyl) anthracene, and the like.

Further illustrative of the novel compounds within the compass of this invention are those wherein the nitrogen atoms of the isothioureidomethyl radical of Formula II, above, are linked by an alkylene linkage. Specifically, there can be mentioned, 9-[S-(2-imidazolin-2-yl)thiomethyl]anthracene, 9,10 - bis[S - (2-imidazolin-2-yl)thiomethyl]anthracene, 9-[S - (3,4,5,6-tetrahydropyrimidin-2-yl)thiomethyl]anthracene, 9,10-bis[S-(3,4,5,6-tetrahydropyrimidin - 2 - yl)thiomethyl]anthracene, 9-[S-4-(or 5-(-methyl-2-imidazolin-2-yl)thiomethyl]anthracene, 9,10-bis[S-(4-(or 5-)methyl-2-imidazolin-2-yl)thiomethyl]anthracene, 9[S-(4-(or 5-, or 6-)methyl-3,4,5,6-tetrahydropyrimidin-2-yl)thiomethyl]anthracene, 9,10-bis[S-(4-(or 5-, or 6-)methyl - 3,4,5,6 - tetrahydropyrimidin-2-yl)thiomethyl]anthracene, and the like.

Also within the scope of our invention are the acid salts of the isothioureido compounds of Formula I, above, as exemplified specifically in the foregoing paragraphs, which salts are illustrated by 9-(isothioureidomethyl)anthracene hydrochloride, 9-(N-methylisothioureidomethyl) anthracene hydrochloride, 9,10-bis(isothioureidomethyl) anthracene dihydrochloride, 9-(N-thiocarbamoylisothioureidomethyl)anthracene hydrochloride, 9[S-(2-imidazolin-2-yl)thiomethyl]anthracene hydrochloride, et cetera, and the corresponding hydrobromides, hydrofluorides, hydroiodides, and the corresponding acetic acid, propionic acid, phosphoric acid, sulfuric acid, and nitric acid compounds.

The compounds of this invention are prepared, generally, by reacting 9-chloromethylanthracene, or, for the disubstituted anthracene compounds, 9,10-bis(chloromethyl)anthracene, with a suitably substituted isothioureido compound, in an inert organic reaction vehicle, to give the hydrochloride salt compounds of this invention, which salts can then be neutralized with a suitable base to form the isothiourea compounds of Formula I, above.

Suitable isothiourea compounds for use as starting materials respond to the formula

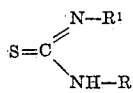

wherein $R^1$ and $R^2$ are defined as before, and are exemplified by isothiourea, N-methylisothiourea, N,N'-dimethylisothiourea, N-ethylisothiourea, N-propylisothiourea, N-butylisothiourea, N-decylisothiourea, N-octadecylisothiourea, N-phenylisothiourea, N-tolylisothiourea, N-xylylisothiourea, N-cumenylisothiourea, N-p-diphenylisothiourea, N-α-naphthylisothiourea, N-(2,4-dichlorophenyl)isothiourea, N-(4-chloro-o-tolyl)isothiourea, 2-thiobiurea, 2,4-dithiobiuret, ethylene thiourea, trimethylene thiourea, and the like.

The 9-chloromethylanthracene or 9,10-bis(chloromethyl)anthracene starting materials of this invention are prepared by means known to the art, for example, as taught in J. Am. Chem. Soc. 77, 2846 (1955).

The reaction of the chloromethylanthracene starting material with the said isothiourea compound can be conducted at temperatures of from 20° C. to 150° C. and preferably of from 50° C. to 100° C. and the reaction temperature is conveniently maintained by refluxing the reaction mixture. The reaction is normally complete after 2 to 6 hours and yields the hydrochloride salt of the anthracenylmethylisothiourea compounds of this invention, said compounds being recoverable from the reaction mixture by crystallization upon cooling the mixture. The compounds can be purified by conventional techniques, e.g., recrystallization from ethanol and washing with, e.g., ethyl ether.

The hydrochloride salts prepared by the above procedure can be neutralized with a suitable base, e.g. sodium or potassium hydroxide, to form the compounds of Formula I, above, which, in turn, can be converted to other acid salts of our invention by addition of acid corresponding to the desired salt.

The following examples are illustrative.

EXAMPLE 1

A mixture of 2.27 grams (0.01 mole) of 9-chloromethyl)anthracene, 40 ml. dry acetone solvent, and 0.8 gram (0.011 mole) of thiourea was refluxed for 2 hours. The reaction mixture was filtered while hot to obtain 2.99 grams of 9-(isothioureidomethyl)anthracene hydrochloride having these analyses:

| | Percent C | Percent H | Percent N | Percent S | Percent Cl |
|---|---|---|---|---|---|
| Calculated | 63.45 | 4.99 | 9.25 | 10.59 | 11.71 |
| Found | 63.41 | 5.09 | 8.92 | 10.09 | 11.17 |

The yield of crystallized product, melting point 215° C., was 99 percent.

EXAMPLE 2

A mixture of 27.4 grams (0.1 mole) of 9,10-bis(chloromethyl)anthracene, 500 ml. absolute ethanol solvent, and 15.2 grams (0.2 mole) thiourea was refluxed for 18 hours. The reaction mixture was cooled to 10° C., diluted with an equal portion of ethyl ether, filtered and washed with ethyl ether to obtain 42 grams of 9,10-bis(isothioureidomethyl) anthracene hydrochloride having these analyses:

| | Percent N | Percent S |
|---|---|---|
| Calculated | 13.13 | 14.95 |
| Found | 12.02 | 13.64 |

The yield of crystallized product, melting point 227° C., was 98 percent.

EXAMPLE 3

A mixture of 21.3 grams (0.05 mole) of 9,10-bis(isothioureidomethyl)anthracene hydrochloride, 500 ml. water solvent and 4 grams (0.1 mole) of sodium hydroxide was stirred for 2 hours at room temperature. The reaction mixture was filtered and washed with water to obtain 15 grams of 9,10-bis(isothioureidomethyl)anthracene having these analyses:

Percent N
Calculated _____ 15.85
Found _____ 14.87

The yield of crystallized product, melting point 238° C., was 85 percent.

EXAMPLE 4

A mixture of 27.4 grams (0.1 mole) of 9,10-bis(chloromethyl)anthracene, 500 ml. absolute ethanol solvent, and 27 grams (0.2 mole) of 2,4-dithiobiuret was refluxed for 8 hours. The reaction mixture was cooled to 10° C., diluted with an equal portion of diethyl ether, filtered and washed with diethyl ether to obtain 50 grams of 9,10-bis(N-thiocarbamoylisothioureidomethyl)anthracene dihydrochloride having these analyses:

Percent N
Calculated _____ 15.41
Found _____ 14.60

The yield of crystallized product, melting point >300° C., was 93 percent.

EXAMPLE 5

A mixture of 27.4 grams (0.1 mole) of 9,10-bis(chloromethyl)anthracene, 500 ml. absolute ethanol solvent, and 20.4 grams (0.2 mole) of ethylene thiourea was refluxed for 6 hours. The reaction mixture was cooled to 10° C., diluted with an equal portion of ethyl ether, filtered and washed with diethyl ether to obtain 45 grams of 9,10-bis-(S - (2 - imidazolin - 2 - yl)thiomethyl)anthracene dihydrochloride, representing a 94 percent yield. The crystallized product had a melting point of 250° C. and its nitrogen analysis was as follows:

Percent
Calculated _____ 11.70
Found _____ 11.68

EXAMPLE 6

A mixture of 24 grams (0.05 mole) of 9,10-bis(S-(2-imidazolin - 2 - yl)thiomethyl)anthracene dihydrochloride, 500 ml. water solvent and 4 grams (0.1 mole) of sodium hydroxide was stirred for 2 hours at room temperature. The reaction mixture was filtered and washed with water to obtain 20 grams of 9,10-bis(S-(2-imidazolin-2-yl)thiomethyl) anthracene. The yield of crystallized product, melting point 235° C., was 98 percent.

EXAMPLE 7

A mixture of 4.52 grams (0.02 mole) of 9-chloromethyl)anthracene, 150 ml. dry acetone solvent, and 2.24 grams (0.022 mole) of ethylene thiourea was refluxed for 3 hours. The reaction mixture was filtered while hot to obtain 5.74 grams of 9-(S-(2-imidazolin-2-yl)thiomethyl)-anthracene hydrochloride having these analyses:

|  | Percent C | Percent H | Percent N | Percent S | Percent Cl |
|---|---|---|---|---|---|
| Calculated | 65.74 | 5.21 | 8.52 | 10.78 | 9.75 |
| Found | 65.26 | 5.26 | 8.55 | 10.82 | 9.71 |

The yield of crystallized product, melting point 205° C., was 87 percent.

The compounds of this invention are useful as chemical intermediates and as pesticides, particularly as fungicides and bactericides. As exemplary, the following compounds were tested.

Compound 1

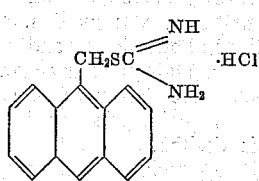

9-(isothioureidomethyl)anthracene hydrochloride, melting point 212–215° C.

Compound 2

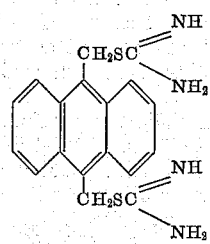

9,10-bis(isothioureidomethyl)anthracene, melting point 238° C.

Compound 3

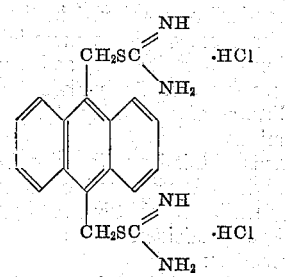

9,10-bis(isothioureidomethyl)anthracene dihydrochloride

Compound 4

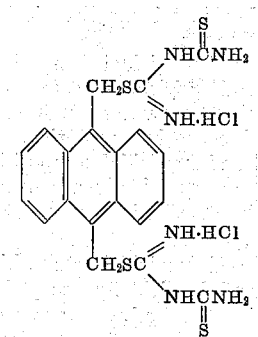

9,10-bis(N-thiocarbamoylisothioureidomethyl)anthracene dihydrochloride

Compound 5

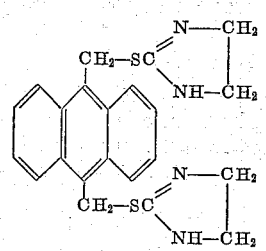

9,10-bis[S-(2-imidazolin-2-yl)thiomethyl]anthracene, melting point: 224–235° C.

Compound 6

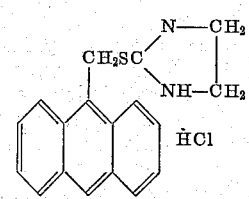

9-[S-(2-imidazolin-2-yl)thiomethyl]anthracene hydrochloride, melting point: 203–205° C.

Compound 7

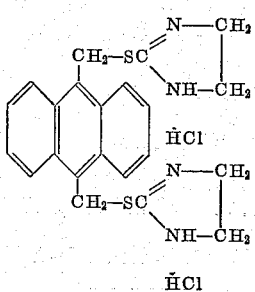

9,10-bis[S-(2-imidazolin-2-yl)thiomethyl]anthracene dihydrochloride, melting point: 250° C.

Unless otherwise noted, Compounds 1–7 were formulated by dissolving one gram of compound in 50 milliliters of acetone in which had been dissolved 0.1 gram (10 percent of the weight of the compound) of "Triton X–155," an alkyl-phenoxy polyethoxyethanol surfactant, as an emulsifying or dispersing agent. The resulting solution was mixed into 200 milliliters of water to give roughly 250 milliliters of a suspension containing the compound in finely divided form. The thus-prepared stock suspension contained 0.4 percent by weight of compound. The test concentrations employed in the tests described hereinbelow were obtained by diluting the stock suspension with water.

The tests employed were as follows:

*Bactericide tests*

The test organisms were *Micrococcus pyogenes* var. *Aureus* (MPA) and *Escherichia coli* (EC). The test organisms were cultured on nutrient agar at controlled conditions of 20° C. and pH 7.0. For each compound in each series of tests a one-half milliliter portion of the bacteria culture was added to a test tube containing a 2-milliliter portion of test compound suspension formulated by diluting the stock suspension containing 250 parts of test compound per million parts of suspension. The test tube containing bacteria culture and test suspension was covered and allowed to stand at 20° C. for twenty-four hours. After the twenty-four hour period a loopful of the tube contents were transferred asceptically to a test tube containing an 8 milliliter aliquot of a nutrient broth in 1000 milliliters of distilled water. The test tube containing the nutrient broth aliquots had been sterilized by plugging and autoclaving for 20 minutes at 15 p.s.i.g. prior to introduction of the bacteria culture/test suspension mixture. The inoculated broth tubes were incubated at 20° C. for 48 hours. The ability of a compound to inhibit bacterial growth was visually rated using the following designations.

5=no growth of bacteria
3=slight to moderate growth of bacteria
1=severe growth of bacteria A control test showed severe growth of bacteria.

The results of these tests are set forth in Table I, below.

*Fungicide tests*

*Bean mildew.*—Tendergreen bean plants with primary leaves fully expanded were infected with the causitive organism of the bean mildew disease, *Erysiphe polygoni*, by brushing their leaves lightly with plants taken from a stock culture of the fungus. Forty-eight hours after infestation, the bean plants were sprayed with water solutions containing 100 parts of test compound per million parts of solution, obtained by diluting the above-described stock suspension with water. Spraying was conducted with a De Vilbiss spray gun set at 40 p.s.i.g., while the potted plants were revolving on a turntable, and lasted thirty seconds. After the sprayed solution had dried on the plants, the plants were removed to the greenhouse and held for seven to ten days after which time the degree of injury to the plant leaves was visually rated according to the following designations:

5=no spots per leaf (100% control)
4=1–3 spots per leaf
3=4–10 spots per leaf
2=many but distinctly separate spots
1= leaf overrun with mildew.

A control test carried out as above, but without addition of test compound, resulted in ratings of 1 for the plants so treated.

The results of these tests are set forth in Table I below.

TABLE I

| Compound No. | Bacteria | | Fungi, Bean Mildew |
|---|---|---|---|
| | MPA | EC | |
| 1 | 5 | 5 | 5 |
| 2 | 5 | 5 | 3 |
| 3 | 5 | 5 | 5 |
| 4 | | | 5 |
| 5 | 5 | | 5 |
| 6 | 5 | 5 | 5 |
| 7 | 5 | 5 | 5 |

Compounds 1, 6, and 7 also displayed significant activity against the causitive organisms of early blight, *Alternaria solani*, by the following test.

*Early blight test.*—For each test compound a standard tomato plant, variety Bonny Best, was sprayed while revolving on a turntable with 100–110 milliliters of a water solution containing 100 parts of test compound per million parts of solution, obtained by diluting the above-described stock formulation with water. Application was made by means of a De Vilbiss spray gun set at 40 p.s.i.g. and lasted thirty seconds. After the spray had dried, the plants were inoculated with the causitive fungus of the early blight disease, viz. *Alternaria solani*, by placing the potted plants on a revolving turntable and spraying the plants with a spore suspension of the organism containing 25,000 to 30,000 spores per milliliter. Spraying was carried out by means of a De Vilbiss spray gun set at 20 p.s.i.g. and lasted 30 seconds. (The fungi used in inoculation has been reared on potato dextrose agar in Petri dishes at 20° C. and were transferred 10 days prior to use and scraped and irradiated with ultraviolet light seven days after transfer.) The inoculated plants were incubated for twenty-four hours at 72° F. and 100 percent relative humidity and then held for an additional twenty-four hour period at room temperature. After this holding period results were observed by counting the total number of lesions on one magnification field (15×) for each of eleven leaflets growing near the three top leaves of each plant. A similar count was made on control plants treated as described above but without addition of test compound. The number of lesions on treated and untreated plants were then compared and each test compound was rated by calculating percent control, defined as $$100 \times \frac{\text{No. of lesions on untreated plant} - \text{No. of lesions on treated plants}}{\text{No. of lesions on untreated plant}}$$

Application of each of Compounds 1, 6 and 7 resulted in 70–90 percent control.

While compounds of this invention may be employed in a variety of applications, biological or otherwise, when employed as biologically-active materials, it will be understood, of course, that such compounds may be utilized in diverse formulations, both liquid and solid, including finely-divided powders and granular materials, solutions, concentrates, emulsifiable concentrates, slurries and the like depending upon the application intended and the formulation media desired.

Thus, it will be appreciated that compounds of this invention may be employed to form biologically-active substances, while compositions may include finely-divided dry or liquid carriers, diluents, extenders, fillers, conditioners, including various clays, diatomaceous earth, talc, spent catalyst, alumina-silica materials, and incorporating liquids, solids, diluents, etc., typically water and various organic liquids such as kerosene, acetone, benzene, toluene, xylene, and other petroleum distillate fractions or mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X–155 (alkyl aryl polyether alcohol, U.S. Patent 2,504,064).

Specific surface active agents suitable for this purpose are set forth in articles by J. W. McCutcheon in Soap and Chemical Specialties, vol. 31, Nos. 7 through 10 (1955).

The term "carrier" as employed in the specification is intended to refer broadly to the material constituting a major proportion of a biologically-active or other formulation and hence includes finely-divided materials, both liquids and solids, as aforementioned conventionally used in such applications.

The compounds of this invention may be used alone or in combination with other known biologically-active material, such as fertilizers, chlorinated hydrocarbon, and organic phosphate pesticides.

What is claimed is:
1. 9-(isothioureidomethyl)anthracene hydrochloride.
2. 9,10-bis(isothioureidomethyl)anthracene.
3. 9,10 - bis(isothioureidomethyl)anthracene dihydrochloride.
4. 9,10 - bis(N - thiocarbamoylisothioureidomethyl)anthracene dihydrochloride.
5. Bactericidal and fungicidal compositions comprising a bactericidally and fungicidally acceptable carrier and, as an active toxicant, effective amounts of 9-(isothioureidomethyl)anthracene hydrochloride.
6. Bactericidal and fungicidal compositions comprising a bactericidally and fungicidally acceptable carrier and, as an active toxicant, effective amounts of 9,10-bis(isothioureidomethyl)anthracene.
7. Bactericidal and fungicidal compositions comprising a bactericidally and fungicidally acceptable carrier and, as an active toxicant, effective amounts of 9,10-bis(isothioureidomethyl)anthracene dihydrochloride.

8. Bactericidal and fungicidal compositions comprising a bactericidally and fungicidally acceptable carrier and, as an active toxicant, effective amounts of 9,10-bis(N-thiocarbamoylisothioureidomethyl)anthracene dihydrochloride.

References Cited by the Examiner
UNITED STATES PATENTS

| | | | |
|---|---|---|---|
| 2,514,650 | 7/50 | Knott et al. | 260—564 |
| 2,640,079 | 5/53 | De Benneville et al. | 260—564 |
| 2,680,745 | 5/54 | Craig et al. | 260—309.6 |
| 3,029,236 | 4/62 | Staeuble et al. | 260—249.5 |

OTHER REFERENCES

Arndt Liebeg's Ann. Chemie, vol. 384, pp. 324, 330–32 (1911).

Boyd et al., Anal. Chem., vol. 32, pp. 551–56 (1960).

Fieser et al., Organic Chemistry, 2nd ed., p. 564, Boston, Heath, 1950.

Torgeson et al., Contributions From Boyce Thompson Institute, vol. 21, No. I, pp. 27–31 (1961).

IRVING MARCUS, *Primary Examiner*.

DUVAL T. McCUTCHEON, WALTER A. MODANCE, *Examiners*.